US011561809B2

(12) United States Patent
Song et al.

(10) Patent No.: US 11,561,809 B2
(45) Date of Patent: Jan. 24, 2023

(54) DYNAMIC REMOTE DISPLAY RESOURCE MANAGEMENT

(71) Applicant: VMware, Inc., Palo Alto, CA (US)

(72) Inventors: Jian Ken Song, Beijing (CN); Lin Lv, Beijing (CN); Jack Liu, Beijing (CN); Yue Sun, Beijing (CN); Sarah Cheng, Beijing (CN)

(73) Assignee: VMware, Inc., Palo Alto, CA (US)

( * ) Notice: Subject to any disclaimer, the term of this patent is extended or adjusted under 35 U.S.C. 154(b) by 15 days.

(21) Appl. No.: 17/367,581

(22) Filed: Jul. 5, 2021

(65) Prior Publication Data
US 2022/0019449 A1 Jan. 20, 2022

Related U.S. Application Data

(63) Continuation of application No. 17/000,596, filed on Aug. 24, 2020, now Pat. No. 11,055,118.

(30) Foreign Application Priority Data

Jul. 20, 2020 (WO) ................ PCT/CN2020/102947

(51) Int. Cl.
*G06F 9/451* (2018.01)
*G06F 9/50* (2006.01)
*G06F 9/455* (2018.01)
*G06F 16/9035* (2019.01)
*G06F 3/01* (2006.01)

(52) U.S. Cl.
CPC .............. *G06F 9/452* (2018.02); *G06F 3/013* (2013.01); *G06F 9/45558* (2013.01); *G06F 9/5044* (2013.01); *G06F 16/9035* (2019.01); *G06F 2009/4557* (2013.01); *G06F 2009/45575* (2013.01)

(58) Field of Classification Search
CPC ...... G06F 9/452; G06F 16/9035; G06F 3/013; G06F 9/45558; G06F 9/5044; G06F 2009/4557; G06F 2009/45575
USPC ....................................................... 715/740
See application file for complete search history.

(56) References Cited

U.S. PATENT DOCUMENTS

| 10,475,416 B2 | 11/2019 | Volpi |
| 2014/0181682 A1 | 6/2014 | Spracklen |
| 2015/0220802 A1 | 8/2015 | Mazur |
| 2016/0283595 A1 | 9/2016 | Folkens |

*Primary Examiner* — William D Titcomb
(74) *Attorney, Agent, or Firm* — Clayton, McKay & Bailey, PC

(57) ABSTRACT

Systems and methods for remote display resource management can allow a remote display to be dynamically modified according to user eye movements. A user device can receive graphical data for a remote display and present the remote display on a local display. A remote display module (RD module) can detect dynamic content in the graphical data. The RD module can monitor eye movements of a user using an eye tracker device to determine when a user is not looking at the dynamic content. When a user looks away from the dynamic content for more than an allowed amount of time, the RD module can send instructions to a server to reduce the quality of the dynamic content in the remote display. The RD module can send instructions to restore the quality of the dynamic content after determining that the user is looking at the dynamic content.

20 Claims, 7 Drawing Sheets

DYNAMIC REMOTE DISPLAY RESOURCE MANAGEMENT

CROSS REFERENCE TO RELATED APPLICATION

This patent application claims priority as a continuation of U.S. application Ser. No. 17/000,596, titled "Dynamic Remote Display Resource Management," filed Aug. 24, 2020, which claims benefit of priority to PCT Application no. PCT/CN2020/102947 ("Dynamic Remote Display Resource Management"), filed in China on Jul. 20, 2020, both of which are hereby incorporated by reference in their entireties its entirety.

BACKGROUND

In recent years, the public cloud has become more mainstream for the IT industry. Because of this, more and more companies have been migrating the virtual desktop infrastructure to a public or hybrid cloud. Many companies utilize virtual machines for running remote desktop applications. For these companies, limiting computing resource consumption s extremely important because they must pay their cloud provider according to CPU, GPU, memory, and network bandwidth consumption.

Current solutions for avoiding resource waste include enacting idle time limits before disconnecting the remote desktop session or locking the remote desktop. However, these solutions cannot eliminate resource wasting that occurs while a user is working on a remote desktop. Idle times are typically determined by mouse and keyboard usage. Setting idle times can frustrate users that may be using the remote desktop without using the mouse or keyboard for a time. The user suddenly gets disconnected or locked out even though the user is actively using the remote desktop. In some cases, companies set longer idle times to prevent this, but that causes additional resource waste while machines sit idle longer.

As a result, a need exists for dynamically managing resources for remote displays.

SUMMARY

Examples described herein include systems and methods for dynamic remote display resource management. In one example, a user device can communicate with a server to establish a remote display connection with a remote device. The remote display connection can allow the user device to present the desktop environment of the remote device on a local display device. An agent on the server can manage the remote display connection between the devices.

In one example, the agent can send graphical data for the remote display to the user device, which the user device can present on the local display device. A module on the user device can monitor the graphical data and user eye movements to dynamically modify the remote display. As an example, the module can detect dynamic content in the graphical data of the remote display. Dynamic content can include portions of the remote display that may use a large amount of CPU, GPU, memory, or bandwidth. Some examples can include a video, web animations, and a second desktop screen. An eye tracking device can track eye movements of a user looking at the remote display and send eye tracking data to the user device. The module can interpret the eye tracking data to determine where the user is looking on the remote display. When the module determines that the user is not looking at the dynamic content, the module can send instructions to the agent to downgrade the dynamic content on the remote display. In one example, the module can determine where the user is looking based at least on the location of a cursor on the remote display.

The agent can be configured to downgrade isolated portions of the remote display. For example, the agent can downgrade a video without downgrading other content in the remote display. The downgrade can reduce usage of computing resources by reducing the quality of dynamic content. As some examples, the downgrade instructions can include reducing frame rates, reducing bit rates, reducing image quality, and reducing the maximum allowed bandwidth for the specified content. The downgrade can freeze video but still send audio information, such that the user can still hear what is happening. The user can therefore still look back at the dynamic content when needed, which can result in the system restoring the dynamic content. In an example, the remote display can be presented on two screens of a local display device, and the instructions can include downgrading one of the screens. In another example, the module can detect that the user is not looking at the remote display at all, and the instructions can include freezing the remote display until the user looks back at the remote display.

In one example, the module can continue to monitor the user eye movements. Upon determining that the user has begun looking at the downgraded dynamic content, the module can send instructions to the agent to restore the dynamic content to its original quality.

The examples summarized above can each be incorporated into a non-transitory, computer-readable medium having instructions that, when executed by a processor associated with a computing device, cause the processor to perform the stages described. Additionally, the example methods summarized above can each be implemented in a systems including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods for remote display resource management can allow a remote display to be dynamically modified according to user eye movements. A user device can receive graphical data for a remote display and present the remote display on a local display. A remote display module (RD module) can detect dynamic content in the graphical data. The RD module can be a process or application that executes on the user device and controls the remote display. Dynamic content can refer to portions of a remote display that may utilize high levels of computing resources, such as videos, web animations, and additional screens. The RD module can monitor eye movements of a user using an eye tracker device to determine when a user is not looking at the dynamic content. When a user looks away from the dynamic content for more than an allowed amount of time, the RD module can send instructions to a server to reduce the quality of the dynamic content in the remote display. The RD module can send instructions to restore the quality of the dynamic content after determining that the user is looking at the dynamic content.

Figure 1:
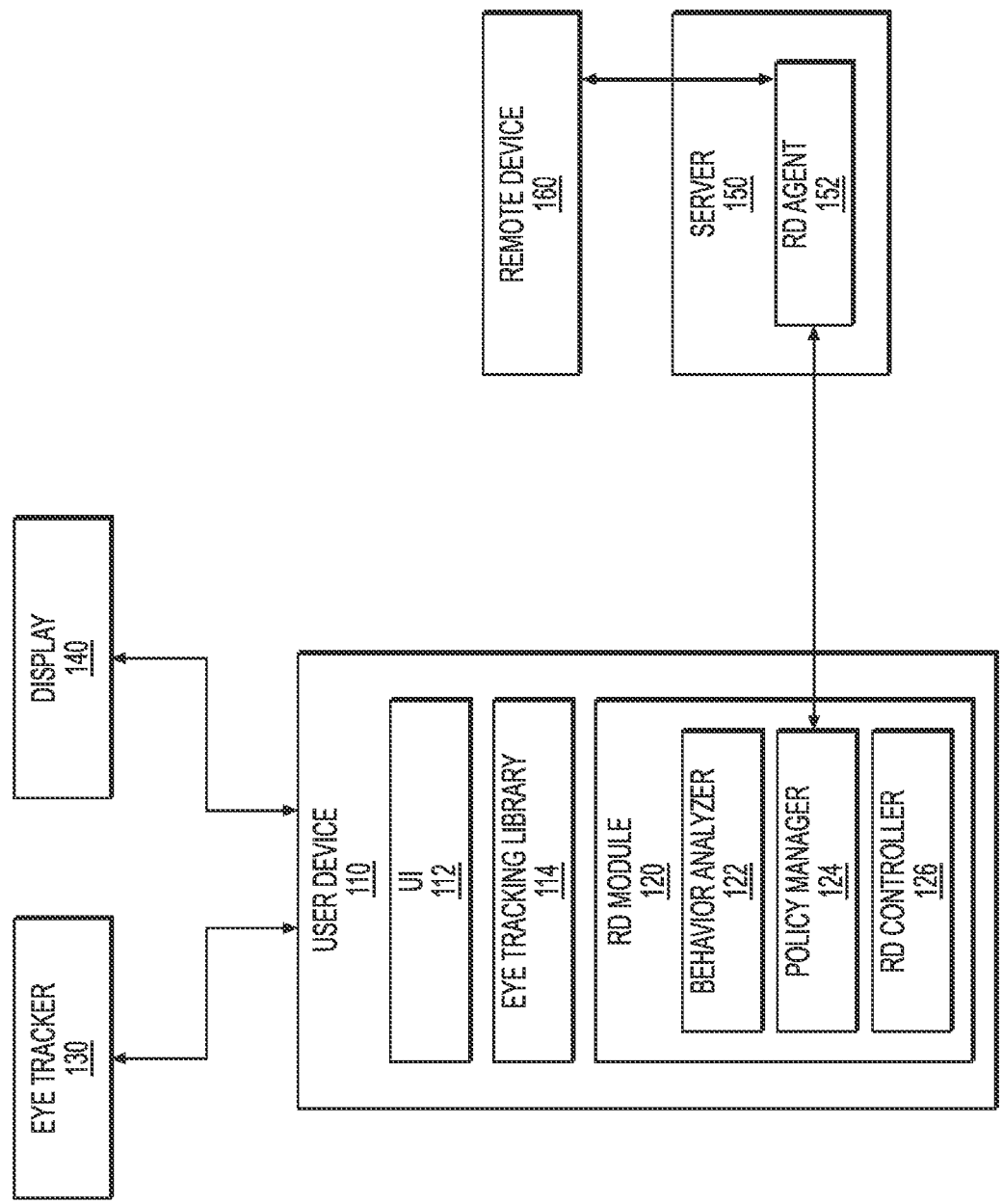
FIG. 1 is an illustration of an example system for performing dynamic remote display resource management.

FIG. 1 is an illustration of a system for performing dynamic remote display resource management. The system can include a user device 110 connected to a local display 140. The user device 110 can be one or more processor-based devices, such as a personal computer, tablet, or cell phone. The local display 140 can be one or more display devices, such as a computer monitor or touch screen. The local display 140 can be peripheral or integrated into the user device 110. A user interface (UI) 112 on the user device 110 can be responsible for providing display data to the local display 140 and managing user inputs.

The user device 110 can also connect to an eye tracker 130. The eye tracker 130 can be a device that measures gaze angles and eyes movements of users. Like the local display 140, it can also be peripheral or integrated into the user device 110. In one example, the eye tracker 130 can include a projector component that project a pattern of near-infrared light on the eyes of a user. A camera component of the eye tracker 130 can record images of the user's eyes with the infrared pattern. The eye tracker 130 can include algorithms to interpret the image data and track a user's eye movements. The user device 110 can include a gaze application programming interface (API) 114 that allows the user device 110 to interface with the eye tracker 130 and interpret the eye tracking data.

An RD module 120 can be installed on or communicate with a user device 110. The RD module 120 can be a process or application that executes on the user device and controls remote displays. In an example, the RD module 120 can be responsible for managing resource allocation and usage for remote displays based on user eye movements. A remote display can refer to an ongoing data transmission between two devices wherein one device runs remotely on the other, such as a remote desktop application. As an example, the RD module 120 can be part of a remote desktop application that allows the desktop environment of the remote device 160 to be run remotely on the user device 110.

The remote display can be facilitated by a server 150. For example, the server 150 can include remote display agent (RD agent) 152 that handles remote display requests, receives graphical data for a remote display from the remote device 160, and sends the graphical data to the user device 110. The RD agent 152 can also be configured to modify the remote display according to instructions provided by the RD module 120. The remote device 160 can be one or more processor-based devices, such as another user device or a server. The remote device 160 can also be part of the server 150 in an example.

The RD module 120 can include submodules, such as a behavior analyzer 122, a policy manager 124 and a remote display controller (RD controller) 126. The behavior analyzer 122 can be responsible for detecting portions of the remote display that can be modified to reduce resource usage. In one example, the behavior analyzer 122 can detect dynamic content in the remote display. Dynamic content can refer to portions of a remote display that may utilize high levels of computing resources, such as videos, web animations, and additional screens. In an example, the behavior analyzer 122 can identify dynamic content by identifying regions on the remote display that frequently change, such as with video. In one example, dynamic content can refer to an interface for one or more applications being displayed. In another example, the behavior analyzer 122 can detect that the remote display includes multiple screens.

The behavior analyzer 122 can also communicate with the eye tracker 130 to retrieve a user's ye position at runtime and monitor a no-gazing time of dynamic content and screens. The no-gazing time can refer to the amount of time a user's gaze is not directed to dynamic content or a screen. The behavior analyzer 122 can analyze the user's eye position according to polices stored and managed in the policy manager 124. Among other things, the policies can define the length of the no-gazing timers. In one example, the policies can be set by an administrator. In another example, the policy manager 124 can set or adjust policies, such as by utilizing a machine learning algorithm. The behavior analyzer 122 can define the bounds of the dynamic content and the continuously compares the eye location data from the eye tracker to those bounds. In an example, the behavior analyzer 122 can keep separate no-gazing timers for each identified dynamic content according to their corresponding policies. When the user's gazing behaviors meet a corresponding no-gazing policy, the behavior analyzer 122 can notify the RD controller 126 to trigger changing the remote display.

The RD controller 126 can be responsible for communicating with the RD agent 152. The RD controller 126 can send instructions to the RD agent 152 for changing the remote display according to triggered policies. In one example, if a user does not look at dynamic content for a specified amount of time, the RD controller 126 can instruct the RD agent 152 to downgrade the dynamic content. Some examples of downgrading dynamic content can include reducing the maximum frame rate, reducing the image quality, reducing the maximum network bandwidth, and disabling audio playback. In another example, in a multiple screen remote display, if a user does not look at one screen for a specified amount of time, the RD controller 126 can instruct the RD agent 152 to downgrade the image quality of that screen. In still another example, if a user does not look at the remote display at all for ore than a specified amount of time, the RD controller 126 can instruct the RD agent 152 to provide a still image of the screen, or in the case of multiple screens the remote display can be reduced to one screen. In instances where the behavior analyzer 122 detects that the user looks at the downgraded screen portion for more than a specified amount of time, the RD controller 126 can be notified and send instructions to the RD agent 152 to restore that screen portion to normal display quality.

The policies can be managed at the policy manager 124. In an example, the polices can be configured both by the user of the device and an administrator. Priority can be given to policy settings set by the administrator over the user. This can allow a user to customize policies within the bounds set by an administrator.

The policies can relate to various aspects of the remote display and user behavior. Some policies can establish no-gazing times. For example, one policy can set the no-gazing time for downgrading dynamic content or applications, and another policy can set the no-gazing time for an entire remote display or one screen in a multi-screen remote display. Some policies can establish how downgrade a remote display when a no-gazing time is exceeded. For example, one policy can set the reduced maximum frame rate, another policy can set the reduced maximum image quality, and another policy can specify a maximum bandwidth that can be used on the downgraded portion of the remote display. Other policies can establish when to disable audio playback, when to freeze a remote display, and when to reduce a multiscreen display to a single screen, Policies can also establish how long a user must look at a downgraded portion of the remote display before the quality is restored.

In one example, the RD module 120 can be a virtual desktop client and the RD agent 152 can sit on a virtual machine running on the server 150. In this example, the remote display can be a virtual desktop environment of the virtual machine. For example, the virtual machine can include a guest operating system that includes a desktop environment, and the RD agent 152 can send graphical data of the desktop environment to the RD module 120. The RD agent 152 and the RD module 120 can communicate to allow user to control the desktop over a network. In an example, the RD agent 152 and the RD module 120 can communicate using a remoting protocol, such as PC over IP (PCOIP), VMWARE BLAST, and VIRTUAL NETWORK COMPUTING (VNC). The RD agent 152 and RD module 120 can exchange information on a series of virtual channels to create usable interface of the desktop environment for a user. For example, the RD agent 152 can continuously send graphical data of the desktop user interface to the RD module 120 on a first virtual channel. The RD module 120 can present the desktop environment on the display 140 as it is received. The RD module 120 can receive user inputs and send them to the RD agent 152 on a second virtual channel. The RD agent 152 can provide the user inputs to the guest operating system on the virtual machine, thus allowing the user to control the desktop.

In some examples, the RD module 120 can be used to manage a remote display even without eye tracker data fro the eye tracker 130. As an example, the RD module 120 can track a mouse cursor of the user device 110 and assess a user's gaze based on the location of the mouse cursor. This may require that the user place the mouse cursor where the gaze is directed. The policies in such an example may allow for greater no-gaze timers to give the user more leniency before downgrading portions of the remote display.

Figure 2:
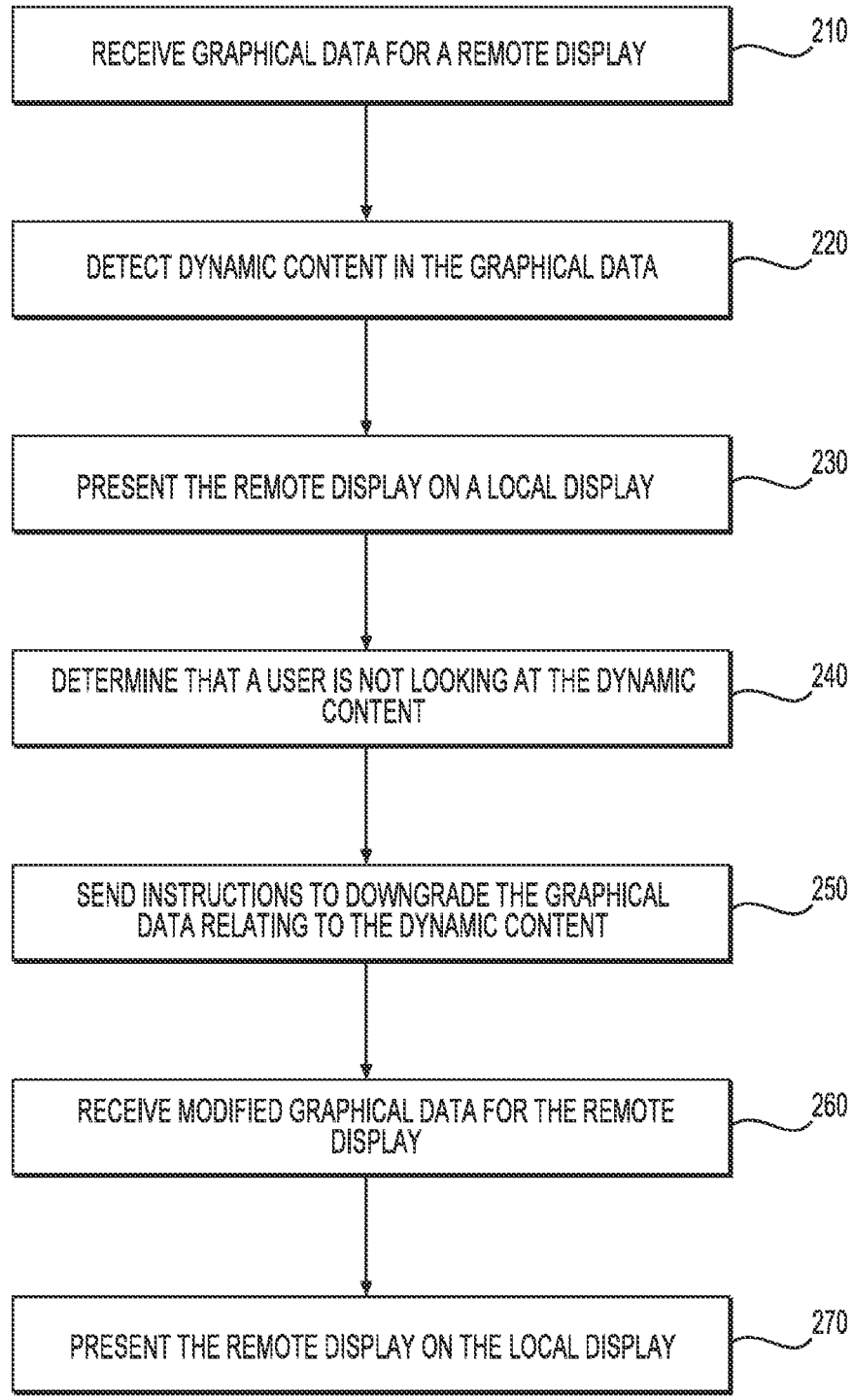
FIG. 2 is a flowchart of an example method for dynamic remote display resource management.

FIG. 2 is a flowchart of an example method for dynamic remote display resource management. At stage 210, the user device 110 can receive graphical data for a remote display. The user device 110 receive the graphical data from the server 150. The remote display can include graphical data of the desktop environment of the remote device 160. As an example, the user device 110 can include an interface that allows a user to input a network address of the remote device 160. The interface can be part of a remote desktop application, for example. The user device 110 can send the network address, along with credentials for accessing the remote device 160, to the server 150. The server 150 can contact the remote device 160 and begin receiving graphical data of the desktop environment of the remote device 160. The server 150 can then transmit the graphical data to the user device 110.

At stage 220, the user device 110 can detect dynamic content in the graphical data, including locations where the dynamic content is displayed. In an example, dynamic content can be defined by policies in the policy manager 124. In another example, the behavior analyzer 122 can monitor the graphical data for dynamic content according to the policies. Some examples of dynamic content can include video, web page animations, and additional screens. As an example, video and animations can be detected by identifying regions of the remote display that frequently change. In an example, the behavior analyzer 122 can continuously monitor the graphical data for dynamic content. Upon detecting dynamic content, the behavior analyzer 122 can monitor the user's eye movements relative to the locations of the dynamic content according to the policies.

At stage 230, the user device 110 cart present the graphical data on the local display 140. In an example, the RD controller 126 can be responsible for communicating with the server 150. The RD controller 126 can receive the graphical data and send it to the UI 112 to present on the display 120. In one example, the remote display can be presented within an application on the user device 110. The user device 110 can also send user inputs, such as mouse clicks and text, to the server 150. The server 150 can communicate the user inputs with the remote device 160 and update the emote display accordingly. This allow a user to interact with the remote display as if the user were using the remote device 160.

At stage 240, the user device 110 can determine that a user is not looking at dynamic content in the remote display. The determination can be made by interpreting eye tracking data from the eye tracker 130. As an example, the user device 110 can instruct the eye tracker 130 to track the user's eye movement when the user device 110 begins rendering the remote display on the local display 140. The eye tracker 130 can track the user's eye movements and send eye tracking data to the user device 110. The eye tracking data can include an indication of whether the user is looking at a screen. The eye tracking data can also include a screen area that the user is viewing, such as center or top-left. The area can also include estimated coordinates in an example. The behavior analyzer 122 can compare the eye tracking data to locations of dynamic data to determine, for example, whether a user is looking in the same area as the dynamic data. The behavior analyzer 122 can interpret the eye tracking data using the gaze API 114. In one example where the user device 110 is not connected to the eye tracker 130, the user device 110 can determine that the user is not looking at the dynamic content based on the position of the mouse cursor.

In an example, the behavior analyzer 122 can use the eye tracking data to monitor user no-gazing times of dynamic content. A user no-gazing time can refer to the amount of time the user is not looking at portion of the remote display associated with dynamic content. When the behavior analyzer 122 determines that the user is not looking at a dynamic content of the remote display, the behavior analyzer 122 can begin a no-gazing timer. In an example, the allotted length of a no-gazing timer can be set in the policy manager 124. The policy manager 124 can also determine how long a user must look back at the dynamic content before the no-gaze timer resets, in an example.

At stage 250, the user device 110 can send instructions to the RD agent 152 to downgrade the graphical data relating to the dynamic content. The policy manager 124 can send those instructions in an example. The instructions can specify how the remote display should be modified. For example, the instructions can include downgrading the quality of dynamic content that the user is not looking at. Such a downgrade can include changing one or more of the maximum frame rate, bit rate, image quality, and maximum bandwidth allotment, as some examples. In another example, a downgrade can include stopping audio playback. In an example where the behavior analyzer 122 determines that the user is not looking at the remote display at all, a downgrade can include freezing the remote display or reducing a multi-screen remote display to one screen.

In an example, the user device 110 can send the instructions according to policies in the policy manager 124. The policies can dictate allowed no-gazing times and corresponding actions that should be taken when a no-gazing time is exceeded. Once the user's gazing behaviors satisfy a policy, the behavior analyzer 122 can notify the RD controller 126, In one example, the notification can include the modifications established by the corresponding policy. Alternatively, the behavior analyzer 122 can notify the RD controller 126 of the relevant policy, and the RD controller can retrieve the corresponding modifications. The RD controller 126 can send instructions to the RD agent 152 according to the policy.

At stage 260, the user device 110 can receive the updated remote display. For example, the RD agent 152 can modify the remote display according to the instructions provided at stage 250. The RD agent 152 can be configured to modify isolated portions of the remote display. As an example, where the user device 110 sends instructions to downgrade a video in a remote display, the RD agent 152 can downgrade the video without downgrading other areas of the remote display. In one example, a remote display can include two videos playing simultaneously, and the RD agent 152 can downgrade one video without affecting the other.

At stage 270, the user device 110 can present the remote display on the local display 140 using the modified graphical data. In an example, the graphical data can be a continuous stream such that any modifications made by the RD agent 152 are automatically carried through to the local display 140. The user device 110 can simply continue to receive the graphical data and render the remote display on the local display 140.

In an example of the above described method, a user initiates a remote display session on the user device 110 for the remote device 160. The RD agent 152 connects to the remote device 160 and starts sending graphical data of the remote device's 160 desktop environment to the user device 110. The user device 110 receives the graphical data and begins rendering the desktop environment on the local display 140. The behavior analyzer 122 instructs the eye tracker 130 to begin tracking the user's eye movements. The behavior analyzer 122 also identifies video playing in the remote display. The behavior analyzer 122 compares the user's eye movements to eye-gazing policies in the policy manager 124. Each time the user's gaze is not directed to the dynamic content, the behavior analyzer 122 begins a no-gaze timer. In an instance where the user's gaze is directed away from the dynamic content for more time than what is allowed by the policy, the behavior analyzer 122 notifies the RD controller 126. The RD controller 126 than sends instructions to the RD agent 152 that the quality of the video content be downgraded according to the policy. The RD agent 152 modifies the remote display according to the instructions, which in turn reduces the quality of the rendered video content. This can reduce the required CPU, GPU, and memory usage of the user device 110 and the server 150, and it also reduces the bandwidth used to send the remote display.

In another example of the above described method, the RD module 120 can execute on the server 150, and the user device 110 can include virtual desktop client. The virtual desktop client can be responsible for receiving graphical data and presenting it on the display as described in stages 210 and 230. The virtual desktop client can also receive eye tracking data from the eye tracker 130 and send the data to the RD agent 152. The RD module 120 on the server 150 can detect dynamic content at stage 220. The behavior analyzer 122 can use the eye tracking data to determine when a user is not looking at the dynamic content at stage 240 according to policies in the policy manager 126. Instead of sending instructions to downgrade graphical data of the dynamic content at stage 250, the RD module 120 can simply downgrade the graphical data according to the policies. The RM module 120 can then send the modified graphical data to the virtual desktop client, which in turn presents the virtual desktop on the display 140 with the downgraded dynamic content.

Figure 3:
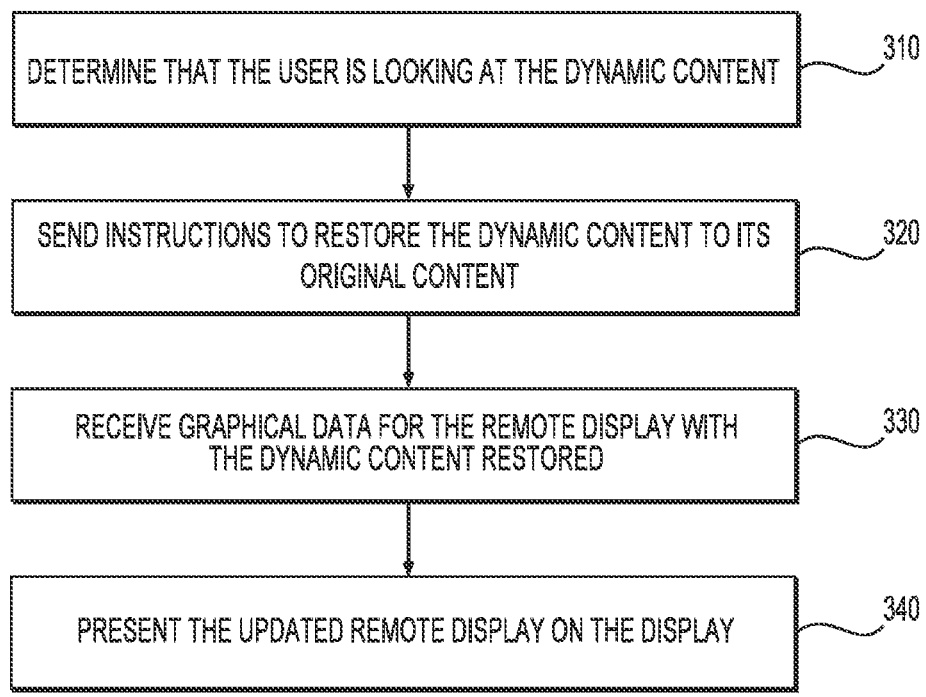
FIG. 3 is another flowchart of an example method for dynamic remote display resource management.

FIG. 3 is another flowchart of an example method for dynamic remote display resource management. In one example, the example method of FIG. 3 can be an extension of the FIG. 2 method. For example, the method described in FIG. 3 can occur after dynamic content in a remote display has been downgraded due to the user not looking at the dynamic content. At stage 310, the user device 110 can determine that the user is looking at the dynamic content. In an example, this can be done by the behavior analyzer 122 using eye tracking data from the eye tracker 130.

In one example, the policy manager 124 can include a policy that requires that the user view the dynamic content for a predetermined amount of time before the quality of the dynamic content can be restored. For example, if the user quickly glances at the content and looks away, the dynamic content can remain downgraded. However, if the user's eyes are directed at the dynamic content for longer than a quick glance, the dynamic content can be restored to its original quality. In one example, the viewing time required to restore downgraded dynamic content can be set by an administrator. In an example, when the user views the downgraded dynamic content for at least the predetermined amount of time, the behavior analyzer 122 can notify the RD controller 126 that the policy has been triggered.

At stage 320, the user device 110 can send instructions to the RD agent 152 to restore the dynamic content to its original quality. The restoration instructions can also be referred to as instructions to upgrade the graphical data. In response, the RD agent 152 can modify the remote display. In one example where there the dynamic content is a video, the RD agent 152 can restore the image quality, frame rate, and allocated bandwidth allotted to the video portion of the remote display. In another example where the RD agent 152 froze the remote display because the user was not looking at the remote display, the RD agent 152 can resume the remote display. In yet another example where the RD agent 152 had reduced a multi-screen display to one screen, the RD agent 152 can resume the remote display for both screens. At stage 330, the user device 110 can receive the updated graphical data for the remote display.

At stage 340, the user device 110 cart present the updated remote display graphical data on the local display 140. In an example, the remote display is a live feed, so the user device 110 merely continues to receive graphical data and present the remote display on the local display 140. In one example where the remote display was reduced from multiple screens to one screen, this can include restoring the remote display on both screens.

Figure 4:
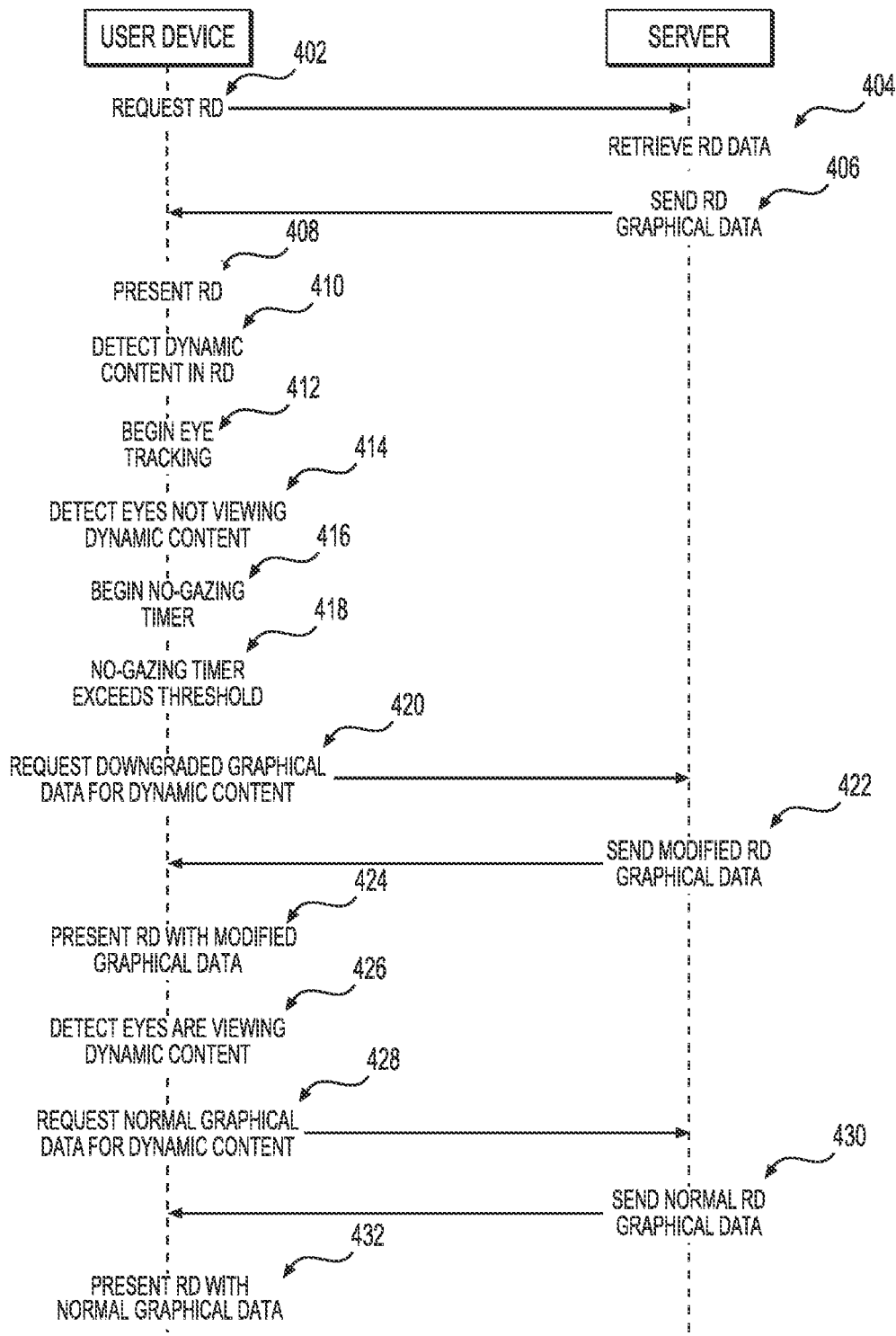
FIG. 4 is a sequence diagram of an example method for dynamic remote display resource management.

FIG. 4 is a sequence diagram of an example method for dynamic remote display resource management. At stage 402, the user device 110 can request a remote display from the server 150. In an example, the request can be handled by the remote agent 152. The request can include identifying information, such as a network address, of a remote device, such as the remote device 160. In an example, the request can also include authentication credentials for accessing the desktop environment of the remote device 160.

Upon receiving the request, and in some examples after verifying the credentials, the server 110 can retrieve graphical data for the remote device's 160 desktop environment at stage 404. At stage 406, the server 150 can send the graphical data to the user device 110. In an example, the server 150 can send the graphical data as a live feed. For example, the graphical data can be a constant video feed of the remote device's 160 desktop environment.

At stage 408, the user device 110 can present the graphical data of the remote display on the local display 140. For example, the user device 110 can present the desktop environment of the remote device 160 on the local display 140. The user device 110 can also send user inputs, such as mouse clicks and text, to the server 150. The server 150 can communicate the user inputs with the remote device 160 and update the remote display accordingly. This can allow a user to interact with the remote display as if the user were using the remote device 160.

At stage 410, the user device 110 can detect dynamic content in the remote display graphical data. In an example, the behavior analyzer 122 can monitor the graphical data for dynamic content according to the policies in the policy manager 124. Upon detecting dynamic content, the behavior analyzer 122 can monitor the user's eye movements relative to the dynamic content according to the policies.

At stage 412, the user device 110 can begin eye tracking. For example, the user device 110 can send instructions to the eye tracker 130 to begin tracking user eye movements. The eye tracker 130 can track the user's eye movements and send eye tracking data to the user device 110. The behavior analyzer 122 can interpret the eye tracking data using the gaze API 114.

At stage 414, the user device 110 can detect that the user's eyes are not looking at the dynamic content. In one example, the remote display can include multiple portions of dynamic content. For example, the remote display can include some combination of a video playing and an open web page with active animation.

When the behavior analyzer 122 detects that the user is not looking at a piece of dynamic content, the user device 110 can start a no-gazing timer at stage 416 for that dynamic content. For example, in a dual screen setup, a no-gazing timer can begin for dynamic content in a first screen while a user is instead looking at a second screen. The no-gazing timer can be an amount of time allotted for a user to not look at dynamic content before the dynamic content is downgraded. The allotted time for no-gazing time can be set by policies in the policy manager 124. In an example, the no-gazing time can be specific to the type of dynamic content. For example, one policy can allow for a certain amount of time for not looking at a playing video, while another policy can allow for a different amount of time when the user is not looking at the remote display at all. In an example, the multiple no-gazing timers can run simultaneously. For example, a remote display can have multiple areas of dynamic content, and the behavior analyzer 122 can begin a new no-gazing timer each time the user looks away from an area of dynamic content.

At stage 418, the no-gazing timer can exceed the allotted time. In an example, the no-gazing timer can exceed the allotted time when the user looks away from dynamic content for more than the allotted time without looking back at the dynamic content. For example, if the behavior analyzer 122 begins a no-gazing timer and the user looks back at the dynamic content before the no-gazing timer expires, the no-gazing timer can stop. The behavior analyzer 122 can reset the timer the next time the user looks away from the dynamic content. In another example, once a no-gaze timer starts, the policies can set an allotted amount of time a user must look at the dynamic content again before the no-gaze timer resets. As an example, a user looks away from dynamic content in the remote display and the behavior analyzer 122 begins the no-gazing timer. If the user quickly glances at the dynamic content and then looks away again, and the quick glance if for less than the allotted reset time, then the behavior analyzer 122 continues the no-gazing timer. However, if a user looks back at the dynamic content for more than the allotted time, then the behavior analyzer 122 can cancel the no-gazing timer.

If the no-gazing timer expires, or runs for more than the allotted time, at stage 420, the user device 110 can send instructions to the server 150 to downgrade the graphical data for the dynamic content. In an example, the downgrade instructions can be for only the dynamic content portion of the remote display. For example, server 150 can be configured to downgrade only portions of the remote display. Some examples of such a downgrade can include reducing the maximum frame rate, image quality, and maximum bandwidth allotment of the dynamic content. In an example where the behavior analyzer 122 determines that the user is not looking at the remote display at all, a downgrade can include freezing the emote display or educing a multi-screen remote display to one screen.

At stage 422, the server 150 can send modified graphical data for the remote display, which the user device 110 can present on the local display 140 at stage 424. The server 150 can send the graphical data as a constant stream, so user device 110 can continue to receive and present the remote display as normal. For example, the user device 110 can determine when the graphical data should be modified and how using the policies in the policy manager 124. The user device 110 can send modification instructions according to the policies, and the server 150 can be configured to execute the changes to the graphical data that is presented on the local display 140.

At stage 426, the user device 110 can detect that the user's eyes are viewing the dynamic content. For example, sometime after the dynamic content has been downgraded, the user can begin looking at the dynamic content. In one example, the policies can include a re-gazing timer that sets an a count of time a user must look at downgraded dynamic content before re-upgrading the quality. If the user looks at the dynamic content for more than the required time, the user device 110 can send instructions to the server 150 to restore the dynamic content to normal quality at stage 428. At stage 430, the server 150 can restore the graphical data for the dynamic content to its normal quality according to the instructions, and at stage 432 dynamic content can be presented on the local display 140 with its normal quality.

Figure 5:
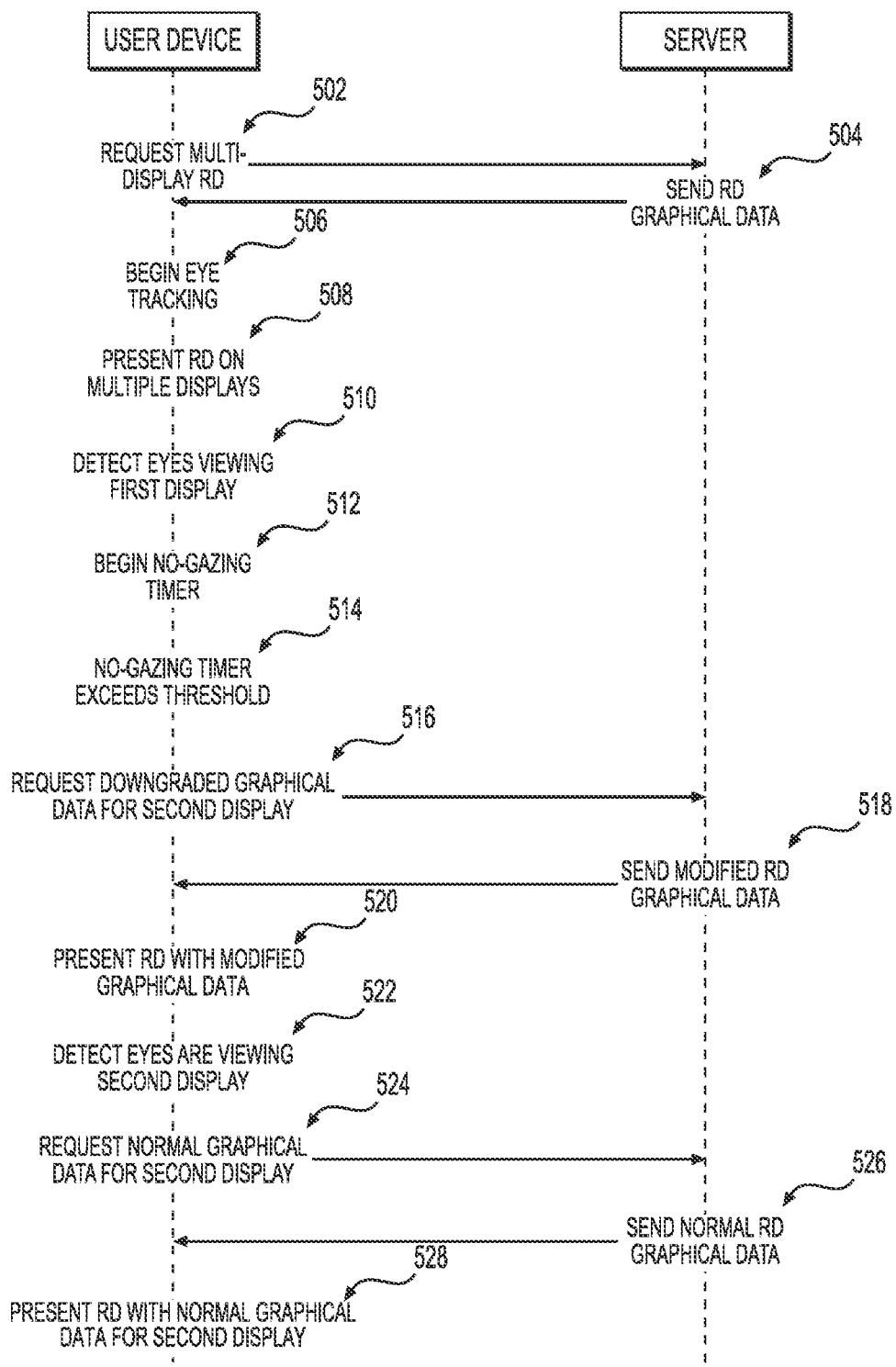
FIG. 5 is another sequence diagram of an example method for dynamic remote display resource management.

FIG. 5 is another sequence diagram of an example method for dynamic remote display resource management. At stage 502, the user device 110 can request a remote display from the server 150. The request can include identifying information, such as a network address, of a remote device, such as the remote device 160. In an example, the request can also include authentication credentials for accessing the desktop environment of the remote device 160.

At stage 504, the server 150 can send the graphical data for the remote display to the user device 110. For example, the server 150 can retrieve graphical data of the remote device's 160 desktop environment and send the graphical data to the user device 110. In an example, the server 150 can send the graphical data as a live feed. For example, the graphical data can be a constant video feed of the remote device's 160 desktop environment.

At stage 506, the user device 110 can begin eye tracking. For example, the user device 110 can send instructions to the eye tracker 130 to begin tracking user eye movements. The eye tracker 130 can track the user's eye movements and send eye tracking data to the user device 110. The behavior analyzer 122 can interpret the eye tracking data using the gaze API 114.

At stage 508, the user device 110 can present the remote display on multiple displays 140. For example, the graphical data for the desktop environment of the remote device 160 can be for two screens, and the local display 140 can be two displays. The server 150 can send the graphical data for both screens and the user device 110 can present the remote display on the corresponding displays 140.

At stage 510, the user device 110 can detect that the user not viewing the remote display, in one example, the behavior analyzer 122 can determine that the user's gaze is directed away from the displays 140. In another example, based on the eye tracking data from the eye tracker 130, the behavior analyzer 122 can determine that the user has stepped away from the displays 140.

At stage 512, the user device 110 can start a no-gazing timer. The no-gazing timer can be an amount of time a user can be not viewing the remote display before the remote display is downgraded. In an example, the length of the no-gazing timer can be set in the policy manager 124. For example, the behavior analyzer 122 can monitor the eye movements of the user according to policies in the policy manager 124, and each time the user looks away from the remote display, the behavior analyzer 122 can begin a no-gazing timer.

At stage 514, the no-gazing tuner can exceed the allotted time. In an example, this can occur when the user looks away from the remote display for more than the allotted time without looking back. For example, the behavior analyzer 122 can begin the no-gazing timer whenever the user looks away from the remote display. If the user looks back before the no-gazing timer exceeds the allotted time, the behavior analyzer 122 can cancel the timer. In one example, the policies can require that the user look back at the remote display for minimum threshold amount of time to trigger canceling the no-gazing timer. For example, if the user quickly glances at the display and looks away, this may not trigger canceling the no-gazing timer. In an example, the minimum threshold time for viewing after a no-gazing timer has begun can be set at the policy manager 124.

If the user does not look back within the allotted time, at stage 516, the user device 110 can send instructions to the server 150 to downgrade the graphical data for the remote display. In an example, the behavior analyzer 122 can notify the RD controller 126 that a no-gazing policy has been triggered, and the RD controller 126 can send instructions corresponding to that policy. In one example, the instructions can include reducing the remote display from multiple screens to one screen. In another example, the instructions can include freezing the remote display.

At stage 518, the server 150 can send modified graphical data for the remote display, which the user device 110 can present on the local display 140 at stage 520. The server 150 can send the graphical data as a constant stream, so user device 110 can continue to receive and present the remote display as normal. For example, the user device 110 can determine when the graphical data should be modified and how using the policies the policy manager 124. The user device 110 can send modification instructions according to the policies, and the server 150 can be configured to execute the changes to the graphical data that is presented on the local display 140.

At stage 522, the user device 110 can detect that the user is viewing the remote display. For example, sometime after the remote display has been downgraded, the user can begin looking at the remote display again. In one example, the policies can include a re-gazing timer that sets an amount of time a user must look at downgraded dynamic content before re-upgrading the quality. If the user looks at the remote display for more than the required time, the user device 110 can send instructions to the server 150 to restore the remote display to normal quality at stage 524. At stage 526, the server 150 can restore the graphical data for the remote display to its normal quality according to the instructions, and at stage 528 the remote display can be presented on the local display 140 with its normal quality and in its normal format.

Figure 6:
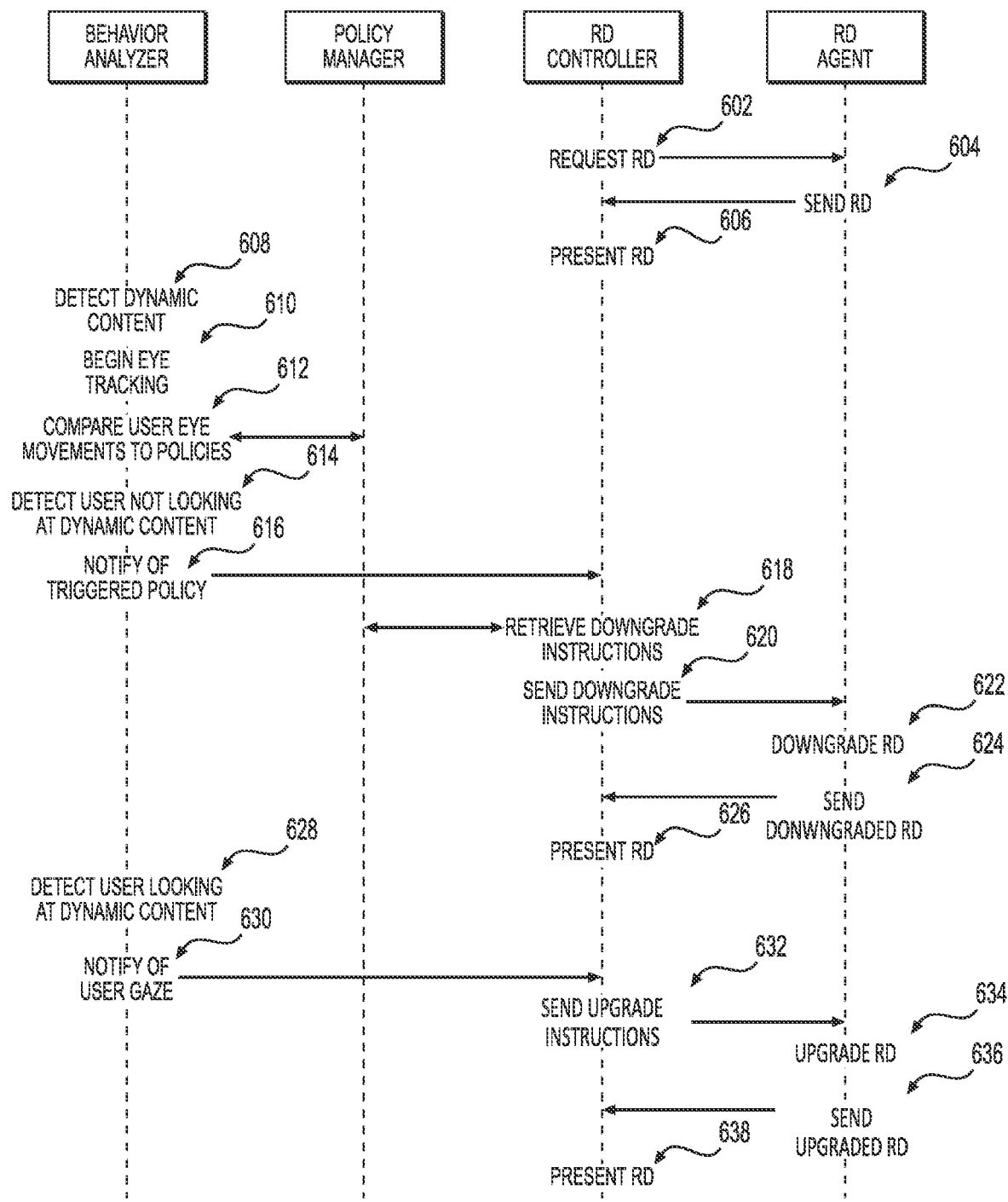
FIG. 6 is another sequence diagram of an example method for dynamic remote display resource management.

FIG. 6 is another sequence diagram of an example method for dynamic remote display resource management that illustrates the roles of the previously discussed submodules.

At stage 602, RD controller 126 can send a request for a remote display from the RD agent 152. In an example, the request can be for the remote device 160. The RD agent 152 can connect to the remote device 160 and retrieve graphical data of the remote device's 160 desktop environment. At stage 604, the RD agent 152 can send the graphical data for the remote display to the RD controller 126.

At stage 606, the RD controller 126 can present the remote display in a display. In one example, this can be handled by the RD module 120. In another example, the graphical data can be sent to the UI 112, which can present the graphical data on the local display 140 as the remote display.

At stage 608, the behavior analyzer 122 can detect dynamic content in the graphical data. For example, the behavior analyzer 122 can detect video, web animations, or other content in the graphical data that may cause high CPU, GPU, memory, or bandwidth usage. At stage 610, the behavior analyzer 122 send instructions to the eye tracker 130 to begin tracking the user's eyes. While the remote display is active, at stage 612 the behavior analyzer 122 can compare the user eye movements to policies in the policy manager 124. For example, the behavior analyzer 122 can interpret eye tracking data from the eye tracker 130 using the gaze API 114 to determine where the user is looking. For example, the behavior analyzer 122 can use the data to determine when the user is looking at dynamic content, when the user is not looking at any dynamic content, and when the user is not looking at the remote display at all. The dynamic content can be categorized according to screen and screen location. The eye tracking data can similarly indicate which screen and location the user is viewing. This can allow the behavior analyzer 122 to determine which dynamic content to upgrade or downgrade.

At stage 614, the behavior analyzer 122 can detect that the user is not looking at dynamic content and start a no-gazing timer. The length of the no-gazing timer can correspond to the policies. In one example, the remote display can include multiple elements of dynamic content, such as a video and a web page with animation, and each element can be analyzed independently with its own no-gazing timer. For example, the behavior analyzer 122 can start a separate timer each time the user looks away from one of the dynamic content elements. The no-gazing timer length for each dynamic content element can vary according to the policies.

At stage 616, the behavior analyzer 122 can then notify the RD controller 126 that a no-gazing policy has been triggered. In an example, the notification can be sent in response to the no-gazing timer expiring. In an example, the behavior analyzer 122 can notify the RD controller 126 which policy has been triggered, and at stage 618 the RD controller 126 can retrieve modification instructions from the policy manager 124 corresponding to that policy. In another example, the behavior analyzer 122 can retrieve the modification instructions and send them to the RD controller 126.

At stage 620, the RD controller 126 can send the modification instructions the RD agent 152. In an example, the modification instructions air include downgrading the video quality of the graphical data in the region of the remote display corresponding to the dynamic content. In another example, the instructions can include freezing the remote display.

At stage 622, RD agent 152 can modify the remote display graphical data, and at stage 624 the RD agent 152 can send the modified graphical data to the RD controller 126. At stage 626, the RD controller can cause the graphical data to be presented on the local display 140. In an example, the RD agent 152 can send the graphical data as a constant stream, so user device 110 can continue to receive and present the remote display as a continuous process without the need for any additional steps.

At stage 628, the behavior analyzer 122 can determine that the user has begun looking at the dynamic content. In an example, the behavior analyzer 122 monitor the user's gaze according to policies in the policy manager 124 to determine whether the user looks at the dynamic content for an amount of three required by the policies. When the policy is satisfied, the behavior analyzer 122 can notify the RD controller 126 at stage 630. The RD controller 126 can then send instructions to the RD agent 152 to restore the dynamic content to its original quality at stage 632. The RD agent 152 can modify the graphical data accordingly at stage 634 and then send the modified graphical data to the RD controller 126 at stage 636. At stage 638, the RD controller 126 can cause the graphical data with the restored quality to be displayed on the local display 140.

Figure 7:
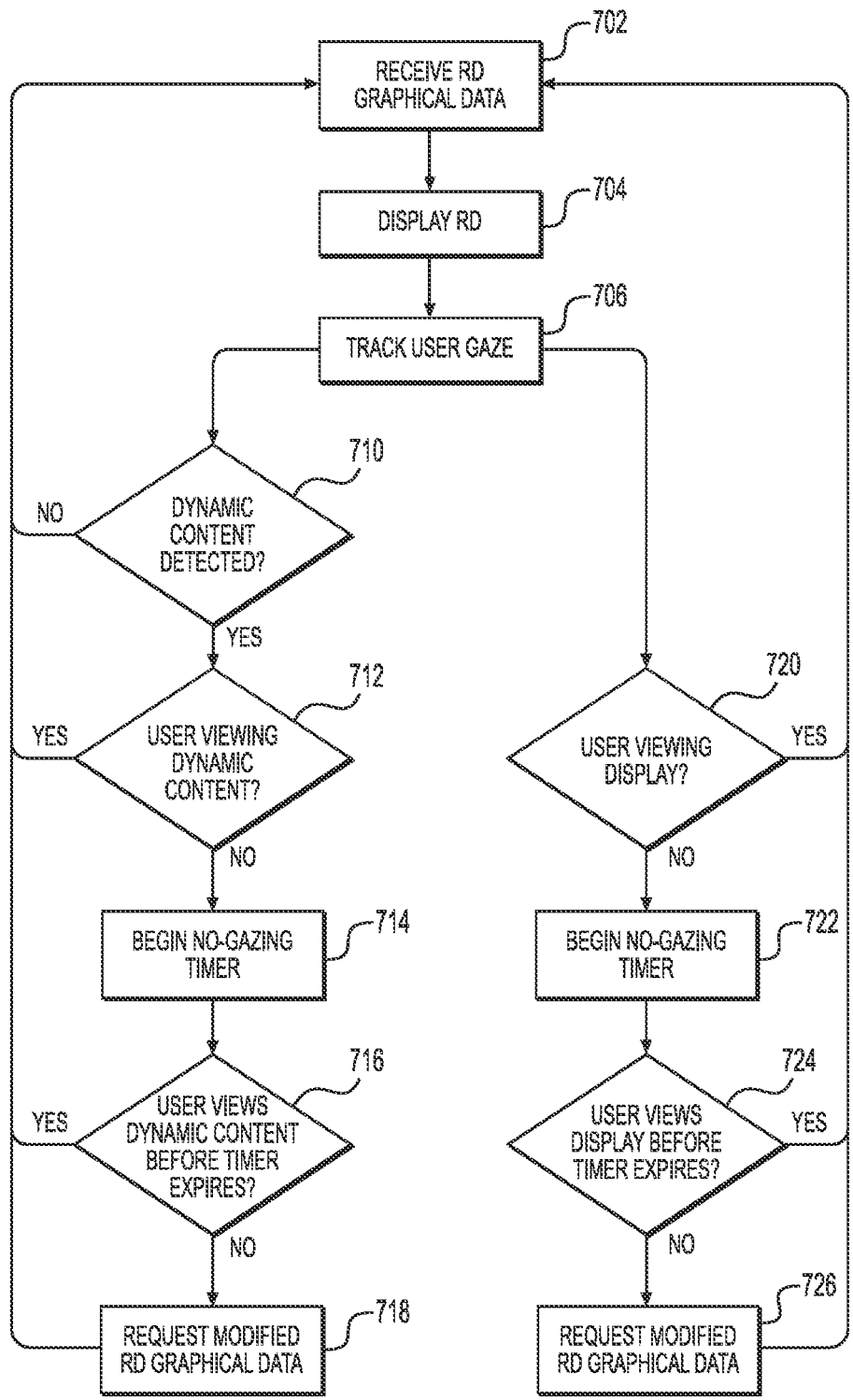
FIG. 7 another flowchart of an example method for dynamic remote display resource management.

FIG. 7 another flowchart of an example method that illustrates simultaneous processes that the RD module 120 can execute. Beginning at stage 702, the RD module 120 can receive graphical data for a remote display. The graphical data can be displayed on the local display 140 at stage 704. In an example, the RD module 120 can send the graphical data to the UI 112, which can then present the remote display on the local display 140.

At stage 706, the RD module 120 can begin tracking a user's gaze. This can include sending instructions to the eye tracker 130 to track the user's gaze. The eye tracker 130 can send eye tracking data to the RD module 120, which can interpret the eye tracking data using a gaze API 114.

At stage 708, the RD module 120 can deter whether the remote display includes dynamic content. In one example, the RD module 120 can continuously, or regularly, analyze the graphical data to detect when dynamic content has entered the graphical data. Although stages 704, 706, and 708 are presented in that order in this example method, these stages can occur in any order. For example, the RD module 120 can begin tracking the user's eye movements before displaying the remote display, or the RD module 120 can begin checking for dynamic content before displaying the remote display or tracking eye movements.

If no dynamic content is detected, the method can return to receive graphical data for a remote display at stage 702. In some examples, the user eye tracking of stage 706 can occur after the dynamic content check of stage 710, and the RD module 120 can wait to initiate eye movement tracking until dynamic content is detected.

If dynamic content is detected, the method can move to stage 712 where the RD module 120 can determine whether the user is looking at the dynamic content. If the user is looking at the dynamic content, the method can return to stage 702 where the RD module 120 continues to receive the graphical data for the remote display. The RD module 120 can continue to monitor the user's eye movements, and when the user looks away from the dynamic content, the method can proceed to stage 714 where the RD module 120 begins a no-gazing timer.

At stage 716, if the user begins looking at the dynamic content before the no-gazing timer expires, the RD module 120 can take no additional action and return to receiving graphical data and analyzing the user's eye movements. If the user does not look at the dynamic content before the no-gazing timer expires, the method can proceed to stage 718 where the RD module 120 requests a downgrade in the graphical data for the portion of the remote display corresponding to the graphical data. The method can then return to receiving graphical data at stage 702.

While the RD module 120 is monitoring user eye movements relating to dynamic content, at stage 720 the RD module 120 can also monitor user eye movements to determine whether the user is looking at the display at all. For example, using eye tracking data from the eye tracker 130, the RD module 120 can determine whether the user has turned away from the local display 140 or stepped away from the local display 140 entirely. If the user is looking at the remote display on the local display 140, then the RD module 120 takes no additional action and the method return to stage 702.

If the RD module 120 determines that the user is not looking at the remote display, at stage 722 the RD module 120 can begin a no-gazing timer at stage 722. At stage 724, if the user begins looking at the remote display before the timer expires, the RD module 120 can take no additional action and the method can return to stage 702. If the user does not begin looking at the remote display before the timer expires, the RD module 120 can send instructions to the server 150 to modify the graphical data for the remote display at stage 726. In one example, the instructions can include downgrading the image and video quality of the remote display. In another example, the instructions can include freezing the remote display as an image until the user looks at the remote display again. In still another example, the remote display can be a multi-screen display, and the instructions can include reducing the remote display to one screen based on which screen the user is viewing.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for dynamic remote display resource management, comprising:
   using eye tracking data received from an eye tracking device, determining that a user is not looking at a screen;
   sending, to a server, instructions to downgrade graphical data that displays on the screen,
      wherein the downgrade includes reducing a quality of the graphical data;
   receiving, from the server, downgraded graphical data; and
   displaying the downgraded graphical data on the screen.

2. The method of claim 1, further comprising detecting dynamic content in the graphical data displayed on the screen prior to sending the instructions to downgrade the graphical data.

3. The method of claim 1, further comprising:
   determining that the user is looking at the downgraded graphical data;
   sending, to the server, additional instructions to upgrade the graphical data;
   receiving, from the server, upgraded graphical data for the remote display; and
   displaying the upgraded graphical data.

4. The method of claim 1, wherein reducing the quality of the graphical data includes at least one of: reducing a frame rate, reducing an image quality, and reducing a maximum bandwidth available for sending the graphical data.

5. The method of claim 1, wherein determining that the user is not looking at the screen includes determining that the user is not looking at any portion of a first display from among multiple displays, and the downgrade includes freezing the graphical data of the first display while not freezing graphical data for at least one other of the multiple displays.

6. The method of claim 1, further comprising:
   in an instance where the user is not looking at dynamic content displayed on a second screen, starting a no-gazing timer for the dynamic content; and
   determining whether to send second instructions to downgrade graphical data of the second display based on whether the user looks back at the dynamic content before the no-gazing timer reaches a threshold.

7. The method of claim 1,
   wherein a remote display agent executes as part of a virtual machine that runs on the server, wherein the virtual machine provides a desktop for the user,
   wherein a virtual desktop client executes on a user device and performs at least the displaying and receiving, and
   wherein the virtual desktop client and remote display agent communicate using a remoting protocol.

8. A non-transitory, computer-readable medium containing instructions that, when executed by a hardware-based processor, performs stages for dynamic remote display resource management, the stages comprising:
   using eye tracking data received from an eye tracking device, determining that a user is not looking at a screen;
   sending, to a server, instructions to downgrade graphical data that displays on the screen,
      wherein the downgrade includes reducing a quality of the graphical data;
   receiving, from the server, downgraded graphical data; and
   displaying the downgraded graphical data on the screen.

9. The non-transitory, computer-readable medium of claim 8, the stages further comprising detecting dynamic content in the graphical data displayed on the screen prior to sending the instructions to downgrade the graphical data.

10. The non-transitory, computer-readable medium of claim 8, the stages further comprising:
    determining that the user is looking at the downgraded graphical data;
    sending, to the server, additional instructions to upgrade the graphical data;
    receiving, from the server, upgraded graphical data for the remote display; and
    displaying the upgraded graphical data.

11. The non-transitory, computer-readable medium of claim 8, wherein reducing the quality of the graphical data includes at least one of: reducing a frame rate, reducing an image quality, and reducing a maximum bandwidth available for sending the graphical data.

12. The non-transitory, computer-readable medium of claim 8, wherein determining that the user is not looking at the screen includes determining that the user is not looking at any portion of a first display from among multiple displays, and the downgrade includes freezing the graphical data of the first display while not freezing graphical data for at least one other of the multiple displays.

13. The non-transitory, computer-readable medium of claim 8, the stages further comprising:
    in an instance where the user is not looking at dynamic content displayed on a second screen, starting a no-gazing timer for the dynamic content; and
    determining whether to send second instructions to downgrade graphical data of the second display based on whether the user looks back at the dynamic content before the no-gazing timer reaches a threshold.

14. The non-transitory, computer-readable medium of claim 8,
    wherein a remote display agent executes as part of a virtual machine that runs on the server, wherein the virtual machine provides a desktop for the user,
    wherein a virtual desktop client executes on a user device and performs at least the displaying and receiving, and
    wherein the virtual desktop client and remote display agent communicate using a remoting protocol.

15. A system for dynamic remote display resource management, comprising:
    a hardware memory that stores instructions; and
    a processor that executes the instructions to perform stages comprising:
       using eye tracking data received from an eye tracking device, determining that a user is not looking at a screen;

sending, to a server, instructions to downgrade graphical data that displays on the screen, wherein the downgrade includes reducing a quality of the graphical data;

receiving, from the server, downgraded graphical data; and displaying the downgraded graphical data on the screen.

16. The system of claim 15, the stages further comprising detecting dynamic content in the graphical data displayed on the screen prior to sending the instructions to downgrade the graphical data.

17. The system of claim 15, the stages further comprising:

determining that the user is looking at the downgraded graphical data;

sending, to the server, additional instructions to upgrade the graphical data;

receiving, from the server, upgraded graphical data for the remote display; and displaying the upgraded graphical data.

18. The system of claim 15, wherein reducing the quality of the graphical data includes at least one of: reducing a frame rate, reducing an image quality, and reducing a maximum bandwidth available for sending the graphical data.

19. The system of claim 15, wherein determining that the user is not looking at the screen includes determining that the user is not looking at any portion of a first display from among multiple displays, and the downgrade includes freezing the graphical data of the first display while not freezing graphical data for at least one other of the multiple displays.

20. The non-transitory, computer-readable medium of claim 8, the stages further comprising:

in an instance where the user is not looking at dynamic content displayed on a second screen, starting a no-gazing timer for the dynamic content; and determining whether to send second instructions to downgrade graphical data of the second display based on whether the user looks back at the dynamic content before the no-gazing timer reaches a threshold.

* * * * *